United States Patent [19]
Grow et al.

[11] Patent Number: 5,235,593
[45] Date of Patent: Aug. 10, 1993

[54] RING LATENCY TIMER

[75] Inventors: Robert M. Grow, San Diego, Calif.; Randall F. Wetzel, Scarborough; Perry S. Stultz, Gorham, both of Me.

[73] Assignee: National Semiconductor Corporation, Santa Clara, Calif.

[21] Appl. No.: 944,795

[22] Filed: Sep. 14, 1992

Related U.S. Application Data

[63] Continuation of Ser. No. 798,865, Nov. 22, 1991, abandoned, which is a continuation of Ser. No. 444,537, Dec. 1, 1989, abandoned.

[51] Int. Cl.$^5$ .............................................. H04J 3/02
[52] U.S. Cl. .................................. 370/85.5; 370/85.4; 340/825.05
[58] Field of Search ................ 370/85.5, 85.12, 85.4, 370/85.6, 85.15, 60, 94.1, 80, 95.1, 85.14, 85.1; 340/825.5, 825.51, 825.05, 825.2, 825.04

[56] References Cited

U.S. PATENT DOCUMENTS

| | | | |
|---|---|---|---|
| 4,404,557 | 9/1983 | Grow | 370/85.5 |
| 4,454,508 | 6/1984 | Grow | 370/85.5 |
| 4,459,588 | 7/1984 | Grow | 370/85.5 |
| 4,538,147 | 8/1985 | Grow | 370/85.5 |
| 4,609,920 | 9/1986 | Segarra | 340/825.51 |
| 4,792,945 | 12/1988 | Mark | 370/85.5 |
| 4,930,121 | 5/1990 | Shiobara | 370/85.6 |
| 4,932,023 | 6/1990 | Geyer et al. | 370/85.4 |
| 4,964,113 | 10/1990 | Geyer et al. | 370/85.5 |
| 4,998,246 | 3/1991 | Tanaka | 370/85.15 |

FOREIGN PATENT DOCUMENTS 266770 5/1988 European Pat. Off. .
WO88/08653 11/1988 PCT Int'l Appl. .

OTHER PUBLICATIONS

IBM Technical Disclosure Bulletin, vol. 29, No. 12, May 1987, New York, US pp. 5419-5422, "Ring Utilization Measurement Device".

William Stallings, *Handbook of Computer Communications Standards*, vol. 2, Howard W. Sims & Company, 1987, pp. 177-191.

Floyd E. Ross, "FDDI—an Overview", Digest of Papers, Computer Soc. Intl. Conf. Compcon '87, pp. 434-444.

FDDI Media Access Control (MAC-M) (Maintenance Revision), Working Draft Proposed American National Standard, X3T9.5/88-139, Rev. 2, Jun. 1, 1989.

The SUPERNET ™ Family for FDDI, Databook, Advanced Micro Devices.

SUPERNET ™ for Fiber Distributed Data Interface, Articles, Advanced Micro Devices.

Primary Examiner—Douglas W. Olms
Assistant Examiner—Dang Ton
Attorney, Agent, or Firm—Limbach & Limbach

[57] ABSTRACT

A ring latency timer provides a station attached to a token ring network with the capability of obtaining an accurate latency measurement of the ring to which it is attached. An internal hardware register, which may be read via the processor control bus interface, contains the latest ring latency measurement. A latency interrupt bit, when cleared, enables the latency measurement function. A subsequent interrupt which causes the latency interrupt bit to be set by the chip signals the completion of the latency measurement and the function is once again disabled. The latency register holds the latency information until the interrupt bit is cleared by the processor.

15 Claims, 7 Drawing Sheets

| FRAME ENABLE | FC | DA | SA | | | |
|---|---|---|---|---|---|---|
| CLAIM -ELA | 83 | MSA | MSA | TREQ | FCS | ED |
| CLAIM ELA | C3 | MLA | MLA | TREQ | FCS | ED |
| BEACON-ELA | 82 | NULL | MSA | TBT | FCS | ED |
| BEACON ELA | C2 | NULL | MLA | TBT | FCS | ED |
| VOID -ESA | 40 | NULL | MLA | FCS | ED | |
| VOID ESA | 00 | NULL | MSA | FCS | ED | |
| MY_VOID_ESA | 40 | MLA | MLA | FCS | ED | |
| MY_VOID ESA | 00 | MSA | MSA | FCS | ED | |

FIG. 7

RING LATENCY TIMER

This is a continuation of co-pending application Ser. No. 798,865, now abandoned, filed on Nov. 22, 1991, which is a continuation of application Ser. No. 444,537 filed Dec. 1, 1989, now abandoned.

BACKGROUND OF THE INVENTION

1. Field of the Invention

The present invention relates generally to data transmission networks and, in particular, to a ring latency timer that allows all stations attached to a token ring network to obtain an accurate latency measurement of the ring and, thereby enable determination of the load on the ring.

2. Discussion of the Prior Art

Communications between stations in a data transmission system occurs through the transmission of a series, or "frame", of information characters, with adjacent frames being separated by explicit or implicit start-stop patterns. The use of a unique start pattern ("start delimiter") and a unique stop pattern ("end delimiter") allows the receiving station to identify the exact beginning and the exact end of each frame.

One type of data transmission system that has been enjoying increasing popularity is the token ring network. A basic token ring network consists of a number of repeater nodes, each of which is connected by unidirectional transmission links to form a closed-loop ring. Information frames are transferred serially, bit by bit, around the ring from one repeater to the next, with each repeater regenerating and retransmitting each bit.

In addition to functioning as a retransmission element, each repeater on the ring also serves as a station attachment point for insertion and retrieval of information by the attached station. As an information frame circulates on the ring past a repeater, the frame's destination address field is copied to the attached station. If the station recognizes the destination address as its own, then it copies the entire frame.

A particular type of token ring network is defined by the Fiber Distributed Data Interface (FDDI) protocol. The FDDI protocol is an American National Standard (ANS) for data transmission which applies to a 100 Mbit/sec. token ring network that utilizes an optical fiber transmission medium. The FDDI protocol is intended as a high performance interconnection between a number of computers as well as between the computers and their associated mass storage subsystems and other peripheral equipment.

As described by William Stallings, *Handbook of Computer-Communication Standards*, Volume 2, Howard W. Sims & Company, 1987, pp. 177-179, the FDDI token ring technique is based on the use of a small token frame that circulates around the ring. A station wishing to transmit on the ring must wait until it detects a token passing by. It then captures the token by aborting token transmission as soon as the usable token is identified. After the token has been captured, the station is granted control of the transmission medium for up to a specified maximum time period during which it may transmit one or more information frames onto the ring.

Information is transmitted on an FDDI ring in frames that consist of a sequence of 5-bit characters or "symbols", each symbol representing 4 data bits or control code. Information is typically transmitted in symbol pairs or "bytes".

FIG. 1 shows the fields which are used within the FDDI frame and token formats. A preamble field (PA), which consists of a sequence of Idle line-state symbols, precedes every transmission. The Idle symbols provide a maximum frequency signal which is used for receive clock synchronization. The Start Delimiter field (SD) consists of a two control symbol start delimiter pair which is uniquely recognizable independent of symbol boundaries. As stated above, the Start Delimiter byte establishes the boundaries for the information that follows. The Frame Control field (FC) defines the type of frame and its characteristics; it is distinguishes synchronous from asynchronous transmission, specifies the length of the address and identifies the type of frame. The Frame Control field uniquely distinguishes a token. The Ending Delimiter field (ED) of a token consists of two end delimiter control symbols and completes a token. The Destination Address (DA) and Source Address (SA) fields contain the destination and source addresses of the transmitted frame. The Destination Address field and the Source Address field are both either two bytes long or six bytes long, as determined by the Frame Control field. The Destination Address may be either an individual address or a group address. The Frame Check Sequence field (FCS), which is four bytes long, contains a cyclic redundancy check using the ANSI standard polynomial. The INFORMATION field, as is the case for all fields covered by the Frame Check Sequence check, consists only of the data symbols. The End Delimiter of a frame is one end delimiter symbol (T), which is followed by the Frame Status field (FS) which consists of three control indicator symbols which indicate whether the addressed station has recognized its address, whether the frame has been copied, or whether any station has detected an error in the frame. The "T" followed by three control indicators represents the minimum end delimiter required by the FDDI protocol for a non-token frame. The protocol allows for additional pairs of control symbols in the End Delimiter or an additional odd number of control symbols followed by one last "T" symbol. All conforming implementations must be able to process these extended end delimiters without truncating them. The end delimiter "T" and the two control symbols "R" and "S" are uniquely encoded and distinguishable from either normal data or Idle symbols.

FIG. 2 shows the component entities necessary for a station to be in compliance with the FDDI protocol. The identified components include a Station Management function (SMT) which is a part of network management that resides in each station on the network to control the overall action of the station to ensure proper operation as a member of the ring. A Physical Layer Medium Dependent (PMD) function provides the fiber-optic links between adjacent stations on the ring. A Physical Layer Protocol function provides the encoding, decoding, (PHY) clocking and synchronization functions. A Media Access Control function (MAC) controls access to the transmission medium, transmitting frames to and receiving frames from the Media Access Control functions of other stations.

The PHY function simultaneously receives and transmits. The PHY function's transmit logic accepts symbols from the Media Access Control function, converts these symbols to 5-bit code groups and transmits the encoded serial stream on the medium. The PHY function's receive logic receives the encoded serial stream from the medium, establishes symbol boundaries based on the recognition of a start delimiter symbol pair and forwards decoded symbols to its associated Media Access Control function.

Additional information regarding the FDDI protocol is presented by Floyd E. Ross, "FDDI—an Overview", Digest of Papers, Computer Soc. Intl. Conf., Compcon '87, pp. 434-444, which is hereby incorporated by reference to provide additional background information relating to the present invention.

As further described by Stallings, the FDDI protocol defines two types of transmissions: synchronous and asynchronous. A "synchronous" transmission is defined as a class of data transmission service whereby each station is allocated a maximum bandwidth and guaranteed a response time not to exceed a specific delay. An "asynchronous" transmission is defined as a class of data transmission service whereby all stations contend for a pool of dynamically allocated ring bandwidth and response time.

In setting up an FDDI network, the user defines a target token rotation time (TTRT). Each station on the ring stores the same value for TTRT. Some or all of the stations on the ring are given a synchronous allocation time ($SA_i$), which may vary among stations. The synchronous allocation must be set such that $$\Sigma SA_i + D.Max + F.Max + Token.T \leq TTRT$$

where
- $SA_1$ = synchronous allocation for station i;
- D.Max = propagation time for one complete circuit of the ring;
- F.Max = time required to transmit a maximum length FDDI frame; and
- Token.T = time required to transmit a token.

When a station receives the FDDI token, it measures the time since it last received a token, which is counted in a token rotation timer (TRT). This value is stored in a token-holding timer (THT). The token rotation timer TRT is reset to zero and begins counting again. The station can then transmit according to the following two rules. First, it may transmit synchronous frames for a time $SA_i$, as defined above. After transmitting synchronous frames, or if it has no synchronous frames to transmit, then the token-holding timer THT is enabled and begins to run from its set value. The station may transmit asynchronous data only so long as THT<TTRT.

Knowing how much transmission traffic, or load, is occurring on the ring at any given time is essential for characterizing ring performance. The network "load" is defined as follows:

$$LOAD = \frac{\text{token rotation time-ring latency}}{\text{token rotation time}}$$

"Ring latency" is defined as the time required for a token to circulate on the ring when the network is idle.

For example, if the ring latency is 1 ms and the observed token rotation time is 2 ms, then the network load is 50%.

Thus, it is critical that the network have the capability of measuring ring latency (a dynamic value because of continual reconfiguration of the network) with extreme accuracy. Furthermore, it would be highly desirable that each network node have the capability for measuring ring latency.

SUMMARY OF THE INVENTION

The present invention provides a ring latency timer which will provide a station attached to a token ring with the capability of obtaining an accurate latency measurement of the ring to which it is attached. An internal hardware register which is contained in the station's associated node hardware, and which may be read via the station's control bus interface, contains the latent ring latency measurement. A latency interrupt bit, when cleared, enables the node's latency measurement function. A subsequent interrupt, which causes the latency interrupt bit to be set by the node, signals the completion of the latency measurement and the function is once again disabled. The latency register holds the latency information until the interrupt bit is cleared by the station.

The latency measurement is initiated whenever all requested frames have been transmitted and the node's MAC function is about to release the token. A uniquely identifiable VOID frame containing the stations' address in both the DA and SA fields is generated within the node and transmitted prior to transmitting the token. The latency counter is incremented on every 16 clock cycles from the point where the VOID frame is released until the VOID frame is received. The latency interrupt bit is then set and the latency measurement function is disabled. As stated above, the latency value remains valid until the interrupt bit is cleared by the processor.

Other features and advantages of the present invention will be understood and appreciated by reference to the detailed description of the invention provided below which should be considered in conjunction with the accompanying drawings.

BRIEF DESCRIPTION OF THE DRAWINGS

FIG. 7 illustrates the format of a My_Void frame.

DETAILED DESCRIPTION OF THE INVENTION

Figure 1:
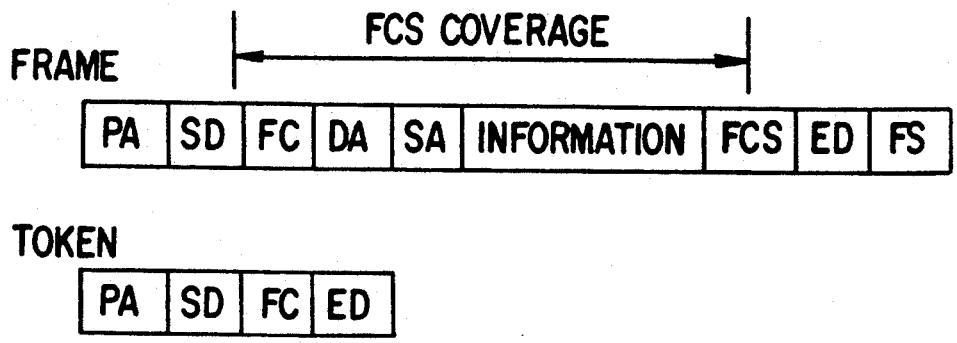
FIG. 1 illustrates the FDDI frame and token formats.
Figure 2:
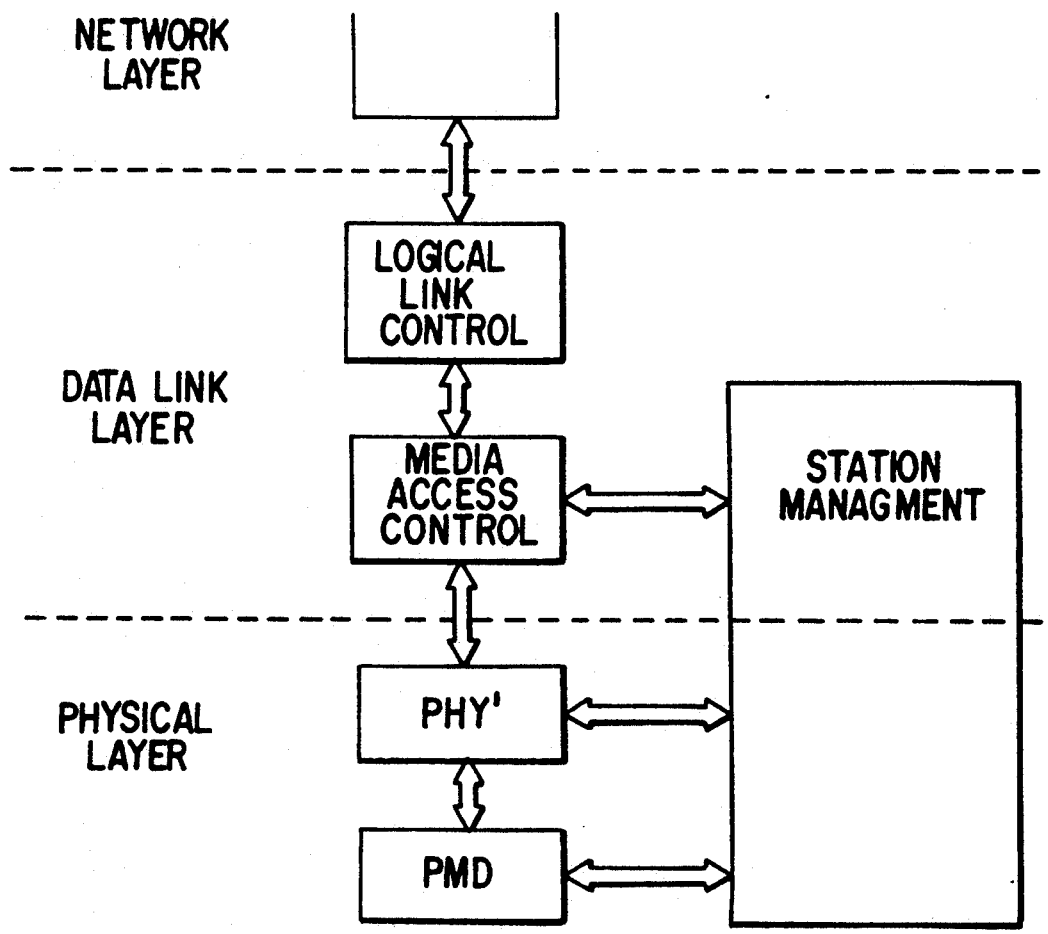
FIG. 2 is a block diagram illustrating the components required for a station in compliance with the FDDI protocol.
Figure 3:
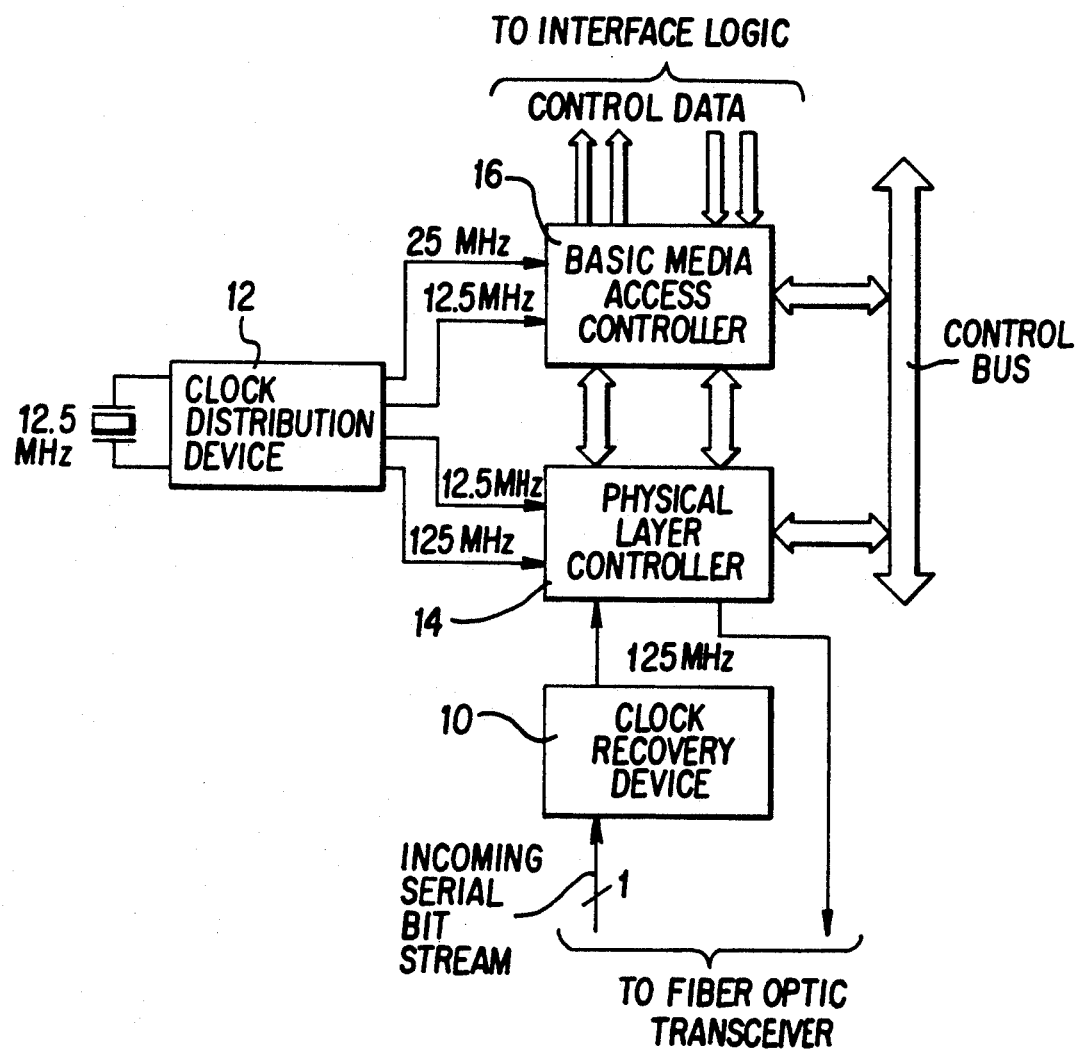
FIG. 3 is a block diagram illustrating station elements which cooperate to provide an integrated interface between a station and an FDDI token ring.

FIG. 3 shows a set of station elements which cooperate to provide an integrated interface between a station and an FDDI token ring.

A clock recovery device 10 extracts a 125 MHz clock from an incoming serial bit stream placed on the FDDI fiber optic transmission medium by the upstream station on the ring. From a 12.5 MHz crystal reference, a clock distribution device 12 synthesizes the various clocks required by a Physical Layer Controller (Player) 14 and a basic Media Access Controller (BMAC) 16. The Player 14 converts the 12.5 Mbyte/sec. stream retrieved from the BMAC 16 and decodes the incoming 4B/5B data into the internal code. The BMAC 16 controls the transmitting, receiving, repeating and stripping of FDDI tokens and frames. Among its features, and as will be described in greater detail below, the BMAC 16 implements the timed token media access control protocol defined by the American National Standards X3T9.5 FDDI MAC standard, which is hereby incorporated by reference (The ANS X3T9.5 MAC standard referenced herein is ANS document X3T9.5/88-139, X3T9/, REV 2, titled "FDDI Media Access Control (MAC-M) (Maintenance Revision)", Working Draft Proposed American National Standard, Jun. 1, 1989).

Figure 4:
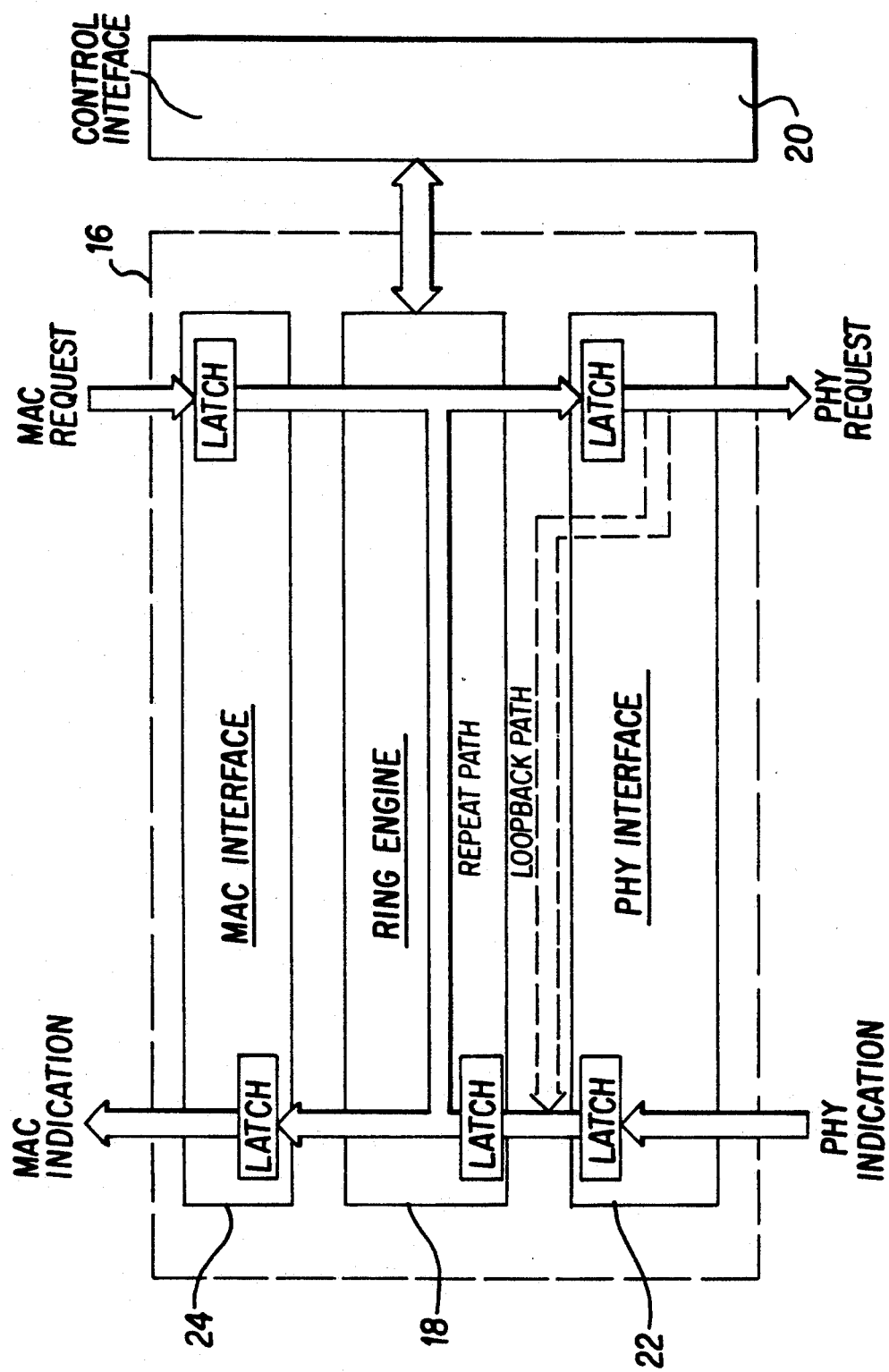
FIG. 4 is a block diagram illustrating the basic components of an embodiment of an FDDI Media Access Control controller.

As shown in FIG. 4, the BMAC 16 includes a ring engine 18, a control interface 20, a PHY interface 22 and a MAC interface 24.

As will be described in greater detail below, the ring engine 18 is the "heart" of the BMAC 16, implementing the ANSI X3T9.5 MAC protocol for transmitting, receiving, repeating and stripping frames on the FDDI ring.

The control interface 20 implements the interface to the Control Bus (see FIG. 3) by which to initialize, monitor and diagnose the operation of the BMAC 16.

The PHY interface 22 provides a byte stream to the Player 14 via the PHY Request bus and receives a byte stream from the Physical 14 via the PHY Indication bus.

The MAC interface 24 provides the interface to the station's external buffering and control logic. A byte stream is provided to the interface logic with appropriate control signals via the MAC Indication bus. A byte stream is provided to the interface with appropriate handshake control signals via the MAC Request bus.

Figure 5:
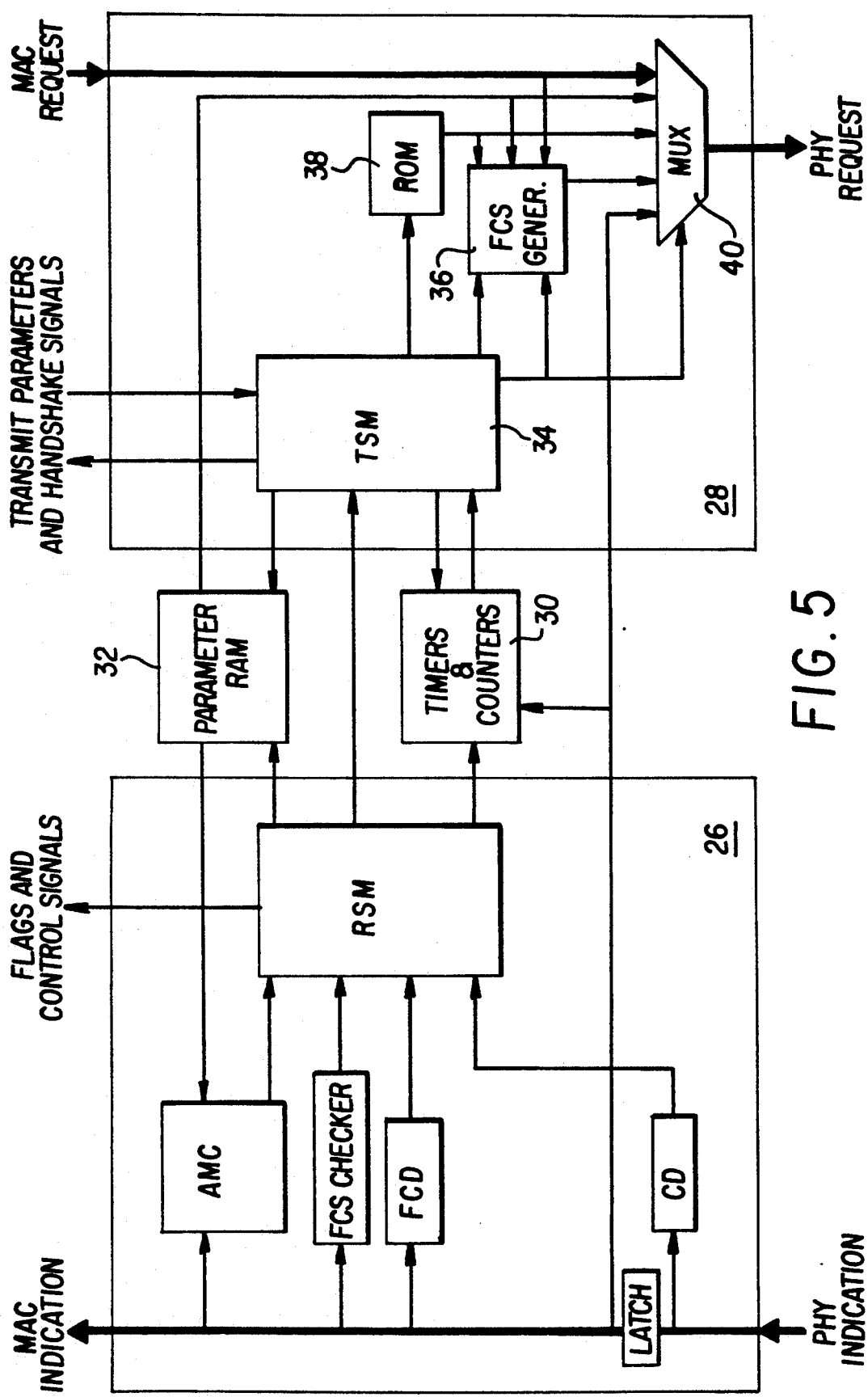
FIG. 5 is a block diagram illustrating an embodiment of a ring engine.

Referring to FIG. 5, the ring engine 18 includes two major blocks, a receiver 26 and a transmitter 28, which share timer/counter logic 30 and a MAC Parameter RAM 32.

The receiver 26 validates information from the FDDI ring, detects errors and failures, and produces appropriate signals and flags that are used by the transmitter 28 and presented to the MAC interface 24. In addition, the receiver 26 delineates frames, tokens and fragments from the byte stream received on the PHY Indication bus based upon identification of start and end delimiters.

The MAC Parameter RAM 32 is a dual-ported RAM that, as implied, contains parameters such as the address of the associated station. The receiver 26 uses the values stored in Parameter RAM 32 to compare received addresses with addresses. The transmitter 28 also uses the parameter RAM 32 for generating the source address (SA) for all frames generated by the station.

The transmitter 28 repeats frames from other stations on the ring and inserts frames from its associated station into the ring in accordance with the FDDI timed-token MAC protocol. The transmitter 28 uses information provided by the receiver 26 to decode whether to repeat, strip or generate a frame. The transmitter 28 continues to repeat frames until a transmission request is conveyed by the associated station to the ring engine 18.

A transmission request includes the requested service class (i.e., synchronous or asynchronous) and the type of token to capture and issue. As stated above, a station gains the right to transmit by capturing the token. Once a token has been captured, the ring engine 18 waits until the data is ready to be transmitted by the station.

As a frame is transmitted, it passes along the ring, with each sequential station inspecting it a byte at a time. The frame is repeated at every station and is eventually stripped by the station that originally transmitted the frame.

As further shown in FIG. 5, the transmitter (TSM) 28 includes a transmitter state machine 34, an FCS generator 36, a ROM 38 and multiplexing logic 40 for controlling the source of data to the ring.

The transmitter state machine 34 is very similar to the Transmitter FSM described in the FDDI standard, "FDDI Media Access Control (MAC-M) (Maintenance Revision)", X3T9.5/88-139, X3T9/, REV2, Jun. 1, 1989, which publication is hereby incorporated by reference. An additional state is added for generation of VOID frames. The majority of sequencing through a frame is provided by the Transmit Timing state machine. This state machine controls a byte counter that is used to sequence through the Destination Address, Source Address and INFORMATION fields of a frame. The byte counter is used to address the parameter RAM for generating the Source Address and sending the Claim and Beacon Information fields.

The FCS generator 36 calculates the 32-bit CRC and appends it to the information from the data stream.

The ROM 38 is used to generate control symbol pairs that are transmitted with the frame as the End Delimiter and Frame Status fields.

The output multiplexor 40 is used to select the source of information to be placed on the PHY Request bus. This information is either repeated from the PHY Indication Bus or independently generated by the associated station. Information can be generated either from the data stream, the ROM 38, the FCS generator 36 or from the parameter RAM 32.

All of the Timers required by the above-referenced standard in addition to several event Counters are maintained within the Timers/Counters Block 30.

Included in the event counters are counters for events which occur too rapidly for software to count. The size of the wrap around counters has been chosen to require minimal software intervention even under marginal operating conditions. The standard specified Frame, Error and Lost counts in addition to several other diagnostic counters are provided. Most of the counters increment in response to events detected by the receiver 26. The counters are readable via the Control Interface.

As stated above, the MAC parameter RAM 32 is a dual ported RAM that contains MAC parameters such as this station's long and short addresses. Both the receiver 26 and transmitter 28 may access the parameter RAM. The receiver 26 uses values retrieved from RAM 32, along with the MAC, to compare received addresses with its stored addresses. The transmitter 28 uses the RAM 32 for generating the Source Address (SA) for all frames and for the Destination Address (DA) and INFO fields on Claim and Beacon frames. These parameters are initialized via the control interface 20 (FIG. 4).

The control interface 20 provides an 8-bit asynchronous interface to internal events and parameters. Access to the ring engine parameter RAM 32, event counters 30 and status is provided via the control interface 20. Ring and token events are latched and may generate interrupts under program control. The current operational mode of the ring engine 18 is also controlled from the operation registers.

The control interface 20 provides synchronization between the asynchronous control bus (FIG. 3) and the synchronous operation of the ring engine 18. The interface to the control bus is identical to that of the PHY function.

The PHY interface is a synchronous interface that provides an encoded byte stream to the PHY function (the PHY Request byte stream), and receives an encoded byte stream from the PHY function (the PHY Indication byte stream).

The MAC interface 22 (FIG. 4) provides the required information and handshakes to allow interface logic to exploit the capabilities of the ring engine 18.

The MAC interface 24 (FIG. 4) is synchronous and is divided into separate MAC Request and MAC Indication interfaces.

The MAC Request interface accepts a byte stream from the data interface logic and utilizes a handshake that separates token capture from data transmission. A captured token may be held until it is no longer usable. As described below, VOID frames are automatically generated to allow the data interface logic as much time as it needs to prepare a transmission.

The MAC Indication interface provides a byte stream with frame sequencing information and information pertaining to the frame being received. The MAC Indication interface also accepts inputs to determine how to set the control indicators and increment the statistical counters based on external address comparison logic and frame copying logic. Frames may also be stripped based on external comparisons.

As indicated above, FDDI uses a timed token protocol to schedule use of the ring. The protocol measures load on the network by timing the rotation of the token. The longer the token rotation time the greater the instantaneous load on the network. By limiting the transmission of data when the token rotation time exceeds a target rotation time, a maximum average token rotation time is realized.

The protocol is used to provide different classes of service.

Multiple classes of service can be accommodated by setting different target rotation times (TTRT) for each class of service. The ring engine 18 supports immediate, synchronous, nonrestricted asynchronous and restricted asynchronous transmission classes. Immediate transmission is supported when the ring is not operational; the other classes are supported when the ring is operational.

The asynchronous class of service is typically used with interactive and background traffic. Asynchronous service is available at 4 priority thresholds, the negotiated target token rotation time plus three programmable thresholds.

The restricted token service is useful for large transfers requiring all of the available (remaining) asynchronous bandwidth. The restricted token service may also be used for operations requiring instantaneous allocation of the remaining synchronous bandwidth when restricted requests are serviced with THT disabled. This is useful when it is necessary to guarantee atomicity i.e. that a multi-frame request will be serviced on a single token opportunity.

The synchronous class of service may be used to guarantee a maximum response time, minimum bandwidth or both. Each time the token arrives, a station is permitted to transmit one or more frames in accordance with its synchronous bandwidth allocation. The ring engine does not provide a mechanism for monitoring the station synchronous bandwidth utilization. The user must insure that no synchronous request that is assembled requires more than the allocated bandwidth. To help insure that synchronous bandwidth is properly allocated after ring configuration, synchronous requests are not serviced after a Beacon frame is received. Since a major reconfiguration may have occurred, management software must intervene to verify or modify the current synchronous bandwidth allocation. Only after management software has intervened are synchronous requests serviced.

The immediate transmission service facilitates several non-standard applications and is useful in ring failure recovery. Certain ring failures may cause the ring to be unstable for normal traffic, until the failure is remedied. Immediate transmission requests are serviced when the ring is non-operational. Immediate requests may be serviced from the transmitter data, claim or Beacon states.

While the ring is operational, every station in the ring uses the negotiated target token rotation time, TNEG. The MAC implements the protocol for negotiation of this target rotation time (TTRT) through the claim process. The shortest requested token rotation time is used by all of the stations in the ring as the TNEG.

If a token is not received within twice TTRT something has gone wrong and the claim process is invoked (as specified in the FDDI standard). A station that receives its own claim frame gains the right to send the first token and make the ring operational again. If the claim process sends not complete successfully, the Beacon process is invoked. The Beacon process is used for fault isolation. A station may invoke the Beacon process through an SM__Control request (Beacon). When a station enters the Beacon process, it continuously send out Beacon frames. The Beacon process is complete when a station receives its own Beacon frame. That station then enters the claim process, to reinitialize the ring.

Figure 6:
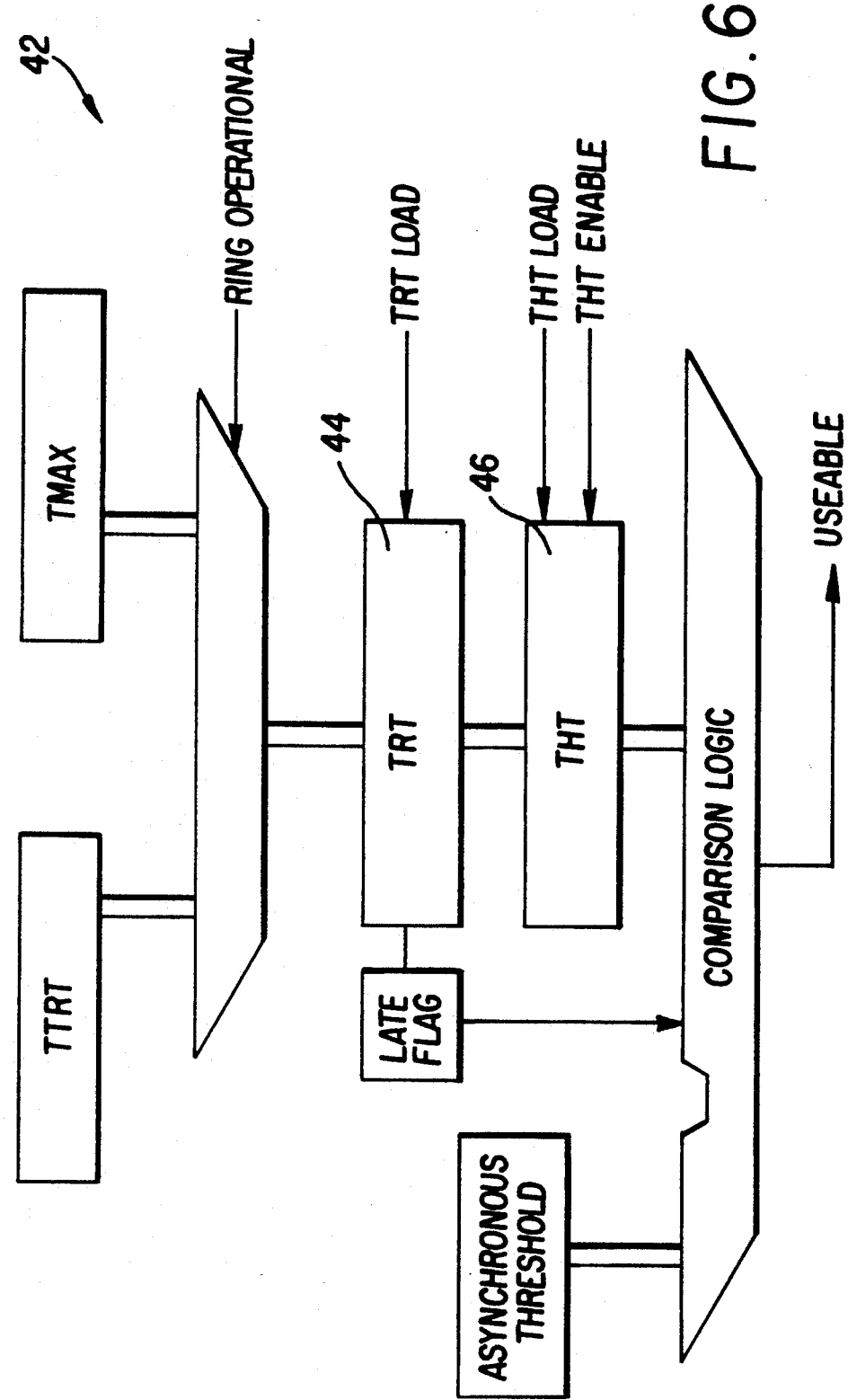
FIG. 6 is a block diagram illustrating asynchronous priority select logic in accordance with the present invention.

Referring to FIG. 6, the token timing logic 42 is controlled by the transmitter 28. The token rotation timer (TRT) 44 is used to time token rotations on the ring from arrival to arrival. The longer the rotation time, the greater the amount of load on the ring. The token holding timer (THT) 46 is used to limit the amount of ring bandwidth used by the station for asynchronous transmission after the token is captured by the station. Before each frame is transmitted, the value of THT is used (as will be described below) to determine if the captured token is still usable for transmission. A token is usable for asynchronous traffic if THT has not reached the selected threshold.

As stated above, four asynchronous thresholds are supported by the MAC; three are programmable and one is fixed at the negotiated target token rotation time (TTRT). Requests to transmit frames at one of the priority thresholds are serviced when the token holding timer 46 has not reached the selected threshold. When TRT reaches TTRT, a Late Flag is set indicating that the token is late. While the Late Flag is set, no asynchronous frames may be transmitted, but the token is available for synchronous transmission. Further information regarding the asynchronous thresholds may be obtained by reference to copending and commonly-assigned U.S. Pat. Appln. Ser. No. 07/444,628, filed of even date herewith, titled ASYNCHRONOUS PRIORITY SELECT LOGIC, now U.S. Pat. No. 5,081,986 which application is hereby incorporated by reference.

Referring back to FIG. 5, the counters 30 are 20-bit wraparound counters, except for late count which is a 4-bit sticky counter. The counters are always readable. Since the control interface 20 is an 8-bit interface, in order to attain a consistent snapshot of a counter, while the least significant byte of a counter is read, the upper 12 bits are loaded into a holding register which are then read.

The following counters are maintained by the ring engine 18:
FRCT:Frame Received
EICT:Error Isolated
LFCT:Lost Frame
FCCT:Frame Copies with Ax set
FNCT:Frames Not Copies with Ax set
FTCT:Frames Transmitted
TKCT:Token Received
RLCT:Ring Latency
LTCT:Late Count Interrupts may be requested when either the counters increment (except for ring latency count) or wraparound (except for the ring latency and late count).

The token received count is incremented every time a valid token arrives. As described in greater detail below, the token count can be used with the ring latency count to calculate the average network load over a period of time. The frequency of token arrival is inversely related to the network load.

The latency count is a measurement of time for a frame or token to propagate around the ring. As described in greater detail below, this counter contains the last measured ring latency whenever the ring latency valid bit of the token event register is one. The latency counter increments every 16 byte times (1.28 usec) and is used to measure ring latencies up to 1.3421772 seconds directly with accuracy of 1.2 usec. No overflow or increment event is provided with this counter.

The latency count can be used in combination with the Token Received count to calculate average load on the network. As mentioned above, this is a valuable network management capability Additional information regarding the event counters may be obtained by reference to co-pending and commonly assigned U.S. Pat. Appln. Ser. No. 07/436,212, filed Nov. 19, 1989, titled RAM BASED EVENTS COUNTER APPARATUS AND METHOD, now U.S. Pat. No. 5,089,957 which application is hereby incorporated by reference.

As described below, in accordance with the present invention, when measuring the ring latency, a My_Void frame is transmitted. When this frame returns, an event is reported. This indicates that the value of the ring latency counter will be valid within 1.28 usec.

The current ring latency is measured by timing the propagation of a My_Void frame round the ring. A new latency measurement can be requested by writing a 0 to the ring latency valid bit of the token event register.

When the ring is operational, the next early token is captured. Before the token is re-issued, a My_Void frame is transmitted and the ring latency counter (RLCT) is reset. The token will not be captured if the Inhibit Token Capture Option (Option.ITC) is set. When the ring is not operational, ring latency timing will commence at the end of the next immediate transmission. A My_Void is transmitted and RLCT is reset.

The ring latency counter increments once every 16 byte times from when the ending delimiter of the My_Void frame is transmitted, until the ending delimiter of the My_Void frame returns. When the My_Void frame returns, the ring latency valid bit (TELR.RLVLD) is set and may cause an interrupt. When set, this bit indicates that RLCT will be valid within 1.28 usec. The ring latency counter can measure ring latencies up to 1.3421772 seconds with accuracy of 1.2 usec.

The ring latency timing function is automatically disabled when exceptions are detected and retried at the next opportunity.

Since a Master Reset (Function.MARST) causes the ring latency valid bit to be cleared, the ring latency will automatically be measured on the first opportunity (at the end of the first immediate request or with the first early token).

As stated above, the ring engine 18 has the capability of generating MAC frames from either the internal parameter RAM 32 or upon request from the data interface. Internally generated MAC frames are continuously transmitted, except when an externally generated MAC frame is ready to be transmitted.

The ring engine 18 generates VOID, CLAIM and BEACON frames. When long addresses are enabled (Option.ELA=1), CLAIM and BEACON frames are sent with long addresses, otherwise they are sent with short addresses. When short addresses are enabled (Option.ESA=1), VOID frames are sent with short addresses otherwise they are sent with long addresses.

On internally generated VOID and BEACON frames, the DA is generally transmitted as the null address. For internally generated CLAIM frames, MLA or MSA is transmitted as the DA. When the stripping option is enabled, or ring latency timing is enabled, one or two void frames are transmitted at the end of the service opportunity with both DA and SA as the MSA or MLA to create a My_g Void frame.

The internally generated CLAIM, BEACON, VOID and MY_VOID frames are formatted as shown in FIG. 7.

Figure 8:
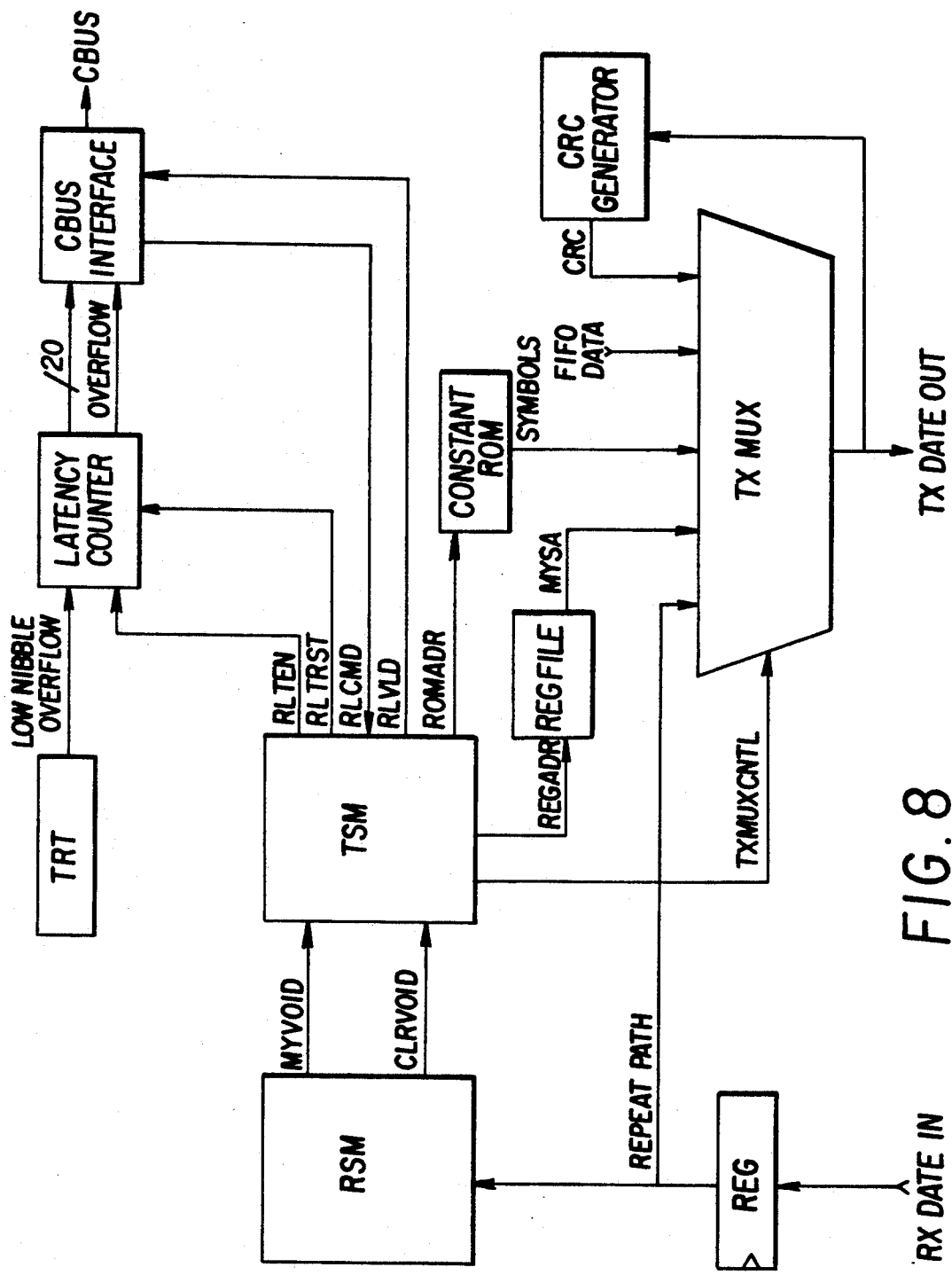
FIG. 8 is a block diagram illustrating a latency timer in accordance with the present invention.

The implementation of the concepts of the present invention may be described more specifically by reference to FIG. 8, which shows a portion of ring engine 18 as illustrated in FIG. 5.

The basic Latency Counter is a 20-bit, RAM-based event counter which is shared by 7 other events within the ring-engine 18. Details regarding this RAM based events counter may be obtained by reference to the above-cited U.S. application Ser. No. 07/436,212 filed Nov. 14, 1989, now U.S. Pat. No. 5,089,957 Since this is a shared counter, the latency value is only accurate to within =/+ 16 byte clock cycles to allow other events to be incremented between latency events. For most all rings, this is perfectly satisfactory. This fact and the 20-bit size of the counter will guarantee a valid measurement without fear of overflow for most all FDDI rings. All FDDI MACs must contain a Token Rotation Timer (TRT). The overflow from the lower 4 bits of this timer is used to clock the latency counter.

The main controller of the latency function is the Transmit State Machine (TSM). This machine receives the command (RLCMD) from the CBUS Interface 20 (see also FIG. 4). If the TSM already has control of the Token when the command is received, the current request of frames continues to be transmitted until the Token must be released. If the TSM is currently IDLE, the next recieved Token usable for asynchronous transmitting is captured. Just prior to transmitting the Token, a My-VOID frame which contains this station's Source Address in both the DA and SA fields of the frame is transmitted. The My-VOID frame has the following structure:

|PA|JK|FC|DA|SA|FCS|ED|FS| where
PA = 8 bytes of IDLEs (16 IDLE symbols)
JK = Starting delimiter
FC = 1 byte of 0 (2 symbols = 0)
DA = Short of Long address = "My Address"
SA = Short or Long address = "My Address"
FCS = 4 bytes of CRC Frame check sequence
ED = 1 symbol Ending Delimiter (t)
FS = 3 symbol Frame Status (RRR)

The frames are formed via the Transmit Multiplexer (TX MUX). This mux is controlled by the TSM. All standard symbol codes come from the CONSTANT ROM. Such codes are II, JK, VOID C, TR, RR. The Source address (My Address) assigned to this station is programmed via the CBUS in the REGFILE. Therefore, the information for the DA and SA come from this block. The FCS comes from the CRC generator which is selected during FCS time.

As the ED of the My_VOID frame is being transmitted, the Ring Latency Counter is reset via the RLTRST output of the TSM. The counter is then enabled by the RLTEN output to begin timing the ring.

The frames being received from the ring are all processed by the Receive State Machine (RSM). This machine informs the TSM when the VOID frame which was transmitted is received (MYVOID). This then disables the Latency Counter (RLTEN) and sets the Latency Valid signal (RLVLD). This signal causes the Ring Latency bit in the CBUS to get set, completing the measurement process.

This method correctly times a standard FDDI ring because all frames which do not contain a stations' Source address must be repeated by that station. Therefore, from the time the station released the My-VOID frame to the time it is received back will only be the time it takes for all stations on the ring to repeat the My_VOID frame, which corresponds to the definition of ring latency.

Several problems could occur on the ring prior to reception of the previously transmitted My_VOID frame which could invalidate the measurement. These cases will cause the Latency Counter to be disabled and another My-VOID frame to be transmitted until a valid MYVOID frame is received. The following cases will cause this CLRVOID condition:
1. A hardware or software reset.
2. The software disabled the validity of "My Address".
3. 2 TRTs have been exceeded which cause entry into CLAIM. (FDDI standard).
4. A CLAIM frame other than our own was received.
5. A BEACON frame was received.
6. A "reserved" MAC frame was received.

Only when a valid MYVOID frame is received will the RLVLD bit be set.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. In a token ring network that includes a plurality of network station nodes that are interconnected in a ring configuration by a unidirectional transmission medium, each network station node having a station attached thereto such that information units may be transferred to stations connected to the unidirectional transmission medium via the network station nodes, at least one of the plurality of network station nodes including ring latency apparatus for measuring the ring latency of the token ring network, the ring latency apparatus comprising:
   (a) information unit generator means for internally generating a uniquely identifiable ring latency information unit in response to a command signal;
   (b) transmission and reception means connected to the information unit generating means for transmitting and receiving the ring latency information unit onto and off from the unidirectional transmission medium; and
   (c) counter means responsive to a transmission and reception of the ring latency information unit by the transmission and reception means for counting the ring latency required for the ring latency information unit to traverse the unidirectional transmission medium back to the at least one network station node, the counter means being connected to the information unit generator means and the transmission and reception means.

2. Ring latency apparatus as in claim 1 and further comprising ring latency storage means connected to the counter means for storing the ring latency.

3. Ring latency apparatus as in claim 1 wherein the information generator means generates an enable signal for enabling the counter means in response to a transmit signal.

4. Ring latency apparatus as i claim 3 wherein the information generator means generates a disable signal for disabling the counter means in response to a received signal.

5. The ring latency apparatus as in claim 4 wherein the transmission and reception means generates the transmit signal when the ring latency information unit is transmitted onto the unidirectional transmission medium.

6. The apparatus of claim 5 wherein the transmitter and receiver means generates the transmit signal as an ending delimiter of the ring latency information unit is being transmitted.

7. The apparatus latency apparatus as in claim 6 wherein the transmission and reception means generates the received signal when the ring latency information unit is received from the unidirectional transmission medium.

8. The ring latency apparatus as in claim 7 wherein the transmission and reception means generates the received signal as an ending delimiter of the ring latency information unit is being received.

9. The ring latency apparatus as in claim 7 wherein the counter means is reset by the enable signal.

10. The ring latency apparatus as in claim 8 wherein the counter means is disabled by the disable signal.

11. The ring latency apparatus as in claim 1 wherein the transmission and reception means transmits the ring latency information unit just prior to transmitting a token.

12. A method of measuring a ring latency of a token ring network that includes a plurality of network station nodes that are interconnected in a ring configuration by a unidirectional transmission medium, each network station node having a station attached thereto such that information units maybe transferred to stations connected to the unidirectional transmission medium via the network station nodes, the method comprising:

(a) internally generating an uniquely identifiable ring latency information unit in an originating network station node, in response to a command signal;

(b) transmitting and receiving the ring latency information unit from the originating network station node onto and off from the unidirectional transmission medium back;

(c) counting the ring latency required for the ring latency information unit to traverse the unidirectional transmission medium back to the originating network station node.

13. A method as in claim 12 and comprising the further step of storing the ring latency in the originating network station node.

14. A method as in claim 12 wherein the generating step further comprises enabling the counting of the ring latency when the ring latency information unit is transmitted.

15. A method as in claim 14 wherein the generating step further comprises disabling the counting of the ring latency when the ring latency information unit is received.

* * * * *

UNITED STATES PATENT AND TRADEMARK OFFICE
CERTIFICATE OF CORRECTION

PATENT NO. : 5,235,593

DATED : August 10, 1993

INVENTOR(S): Robert M. Grow, Randall F. Wetzel and Perry S. Stultz

It is certified that error appears in the above - identified patent and that said Letters Patent is hereby corrected as shown below:

In the Claims:

In Col. 12, line 36, delete "i" and replace with --in--.

In Col. 12, line 49, delete "apparatus latency apparatus" and replace with --ring latency apparatus--.

Signed and Sealed this

Third Day of May, 1994

Attest:

BRUCE LEHMAN

Attesting Officer

Commissioner of Patents and Trademarks